United States Patent
Long

(10) Patent No.: US 12,225,622 B2
(45) Date of Patent: Feb. 11, 2025

(54) METHODS AND NETWORK NODES FOR TRACING USER EQUIPMENT

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 17/601,164

(22) PCT Filed: Sep. 9, 2019

(86) PCT No.: PCT/CN2019/104959
§ 371 (c)(1),
(2) Date: Oct. 4, 2021

(87) PCT Pub. No.: WO2020/215586
PCT Pub. Date: Oct. 29, 2020

(65) Prior Publication Data
US 2022/0182809 A1   Jun. 9, 2022

(30) Foreign Application Priority Data

Apr. 25, 2019 (WO) ............... PCT/CN2019/084401

(51) Int. Cl.
*H04W 8/06* (2009.01)
*H04W 8/26* (2009.01)
(52) U.S. Cl.
CPC .............. *H04W 8/06* (2013.01); *H04W 8/26* (2013.01)
(58) Field of Classification Search
CPC ............................. H04W 12/06; H04W 4/029
See application file for complete search history.

(56) References Cited

U.S. PATENT DOCUMENTS

2011/0222511 A1* 9/2011 Weng .............. H04L 41/085
370/329
2013/0150008 A1 6/2013 Huang et al.
(Continued)

FOREIGN PATENT DOCUMENTS

CN        107580324 A        1/2018
CN        108901018 A        11/2018
(Continued)

OTHER PUBLICATIONS

"3GPP TS 23.501 V16.0.0", 3rd Generation Partnership Project; Technical Specification Group Services and System Aspects; System Architecture for the 5G System; Stage 2 (Release 16), Mar. 2019, pp. 1-318.
(Continued)

*Primary Examiner* — Kevin Kim
(74) *Attorney, Agent, or Firm* — Murphy, Bilak & Homiller, PLLC

(57) ABSTRACT

The present disclosure provides a method (100) in an authentication node for tracing a User Equipment, UE. The method (100) includes: receiving (110) a tracing activation instruction to activate tracing of the UE based on an equipment identifier of the UE; obtaining (120) trace requirement data associated with the UE; receiving (130) from a network node a first signaling message containing the equipment identifier of the UE; and generating (140) a trace record related to the UE based on the trace requirement data in response to receiving the first signaling message.

17 Claims, 4 Drawing Sheets

(56) References Cited

U.S. PATENT DOCUMENTS

| | | | |
|---|---|---|---|
| 2015/0195773 A1* | 7/2015 | Weng | H04W 48/14 370/328 |
| 2018/0192289 A1 | 7/2018 | Dao | |
| 2018/0376444 A1 | 12/2018 | Kim et al. | |
| 2020/0153830 A1 | 5/2020 | Li et al. | |
| 2020/0260401 A1* | 8/2020 | So | H04W 76/50 |

FOREIGN PATENT DOCUMENTS

| | | | | |
|---|---|---|---|---|
| JP | 2013539632 A | 10/2013 | | |
| JP | 7324863 B2 | 8/2023 | | |
| WO | 2019017840 A1 | 1/2019 | | |
| WO | WO-2019057042 A1 * | 3/2019 | | H04W 24/10 |
| WO | 2019062862 A1 | 4/2019 | | |

OTHER PUBLICATIONS

"3GPP TS 23.501 V16.0.2", 3rd Generation Partnership Project; Technical Specification Group Services and System Aspects; System Architecture for the 5G System; Stage 2 (Release 16), Apr. 2019, pp. 1-317.

"3GPP TS 23.502 V16.0.0", 3rd Generation Partnership Project; Technical Specification Group Services and System Aspects; Procedures for the 5G System; Stage 2 (Release 16), Mar. 2019, pp. 1-420.

"3GPP TS 23.503 V16.0.0", 3rd Generation Partnership Project; Technical Specification Group Services and System Aspects; Policy and Charging Control Framework for the 5G System; Stage 2 (Release 16), Mar. 2019, pp. 1-84.

"3GPP TS 29.509 V15.3.0", 3rd Generation Partnership Project; Technical Specification Group Core Network and Terminals; 5G System; Authentication Server Services; Stage 3 (Release 15), Mar. 2019, pp. 1-49.

"3GPP TS 29.571 V15.3.0", 3rd Generation Partnership Project; Technical Specification Group Core Network and Terminals; 5G System; Common Data Types for Service Based Interfaces; Stage 3 (Release 15), Mar. 2019, pp. 1-73.

"3GPP TS 32.421 V15.0.0", 3rd Generation Partnership Project; Technical Specification Group Services and System Aspects; Telecommunication management; Subscriber and equipment trace; Trace concepts and requirements (Release 15), Jun. 2018, pp. 1-45.

"3GPP TS 32.422 V15.2.0", 3rd Generation Partnership Project; Technical Specification Group Services and System Aspects; Telecommunication management; Subscriber and equipment trace; Trace control and configuration management (Release 15), Jun. 2019, pp. 1-189.

"3GPP TS 32.423 V15.0.0", 3rd Generation Partnership Project; Technical Specification Group Services and System Aspects; Telecommunication management; Subscriber and equipment trace; Trace data definition and management (Release 15), Jun. 2018, pp. 1-93.

"3GPP TS 23.502 V16.0.2", 3rd Generation Partnership Project; Technical Specification Group Services and System Aspects; Procedures for the 5G System; Stage 2 (Release 16), Apr. 2019, pp. 1-290.

"3GPP TS 32.422 V15.1.0", 3rd Generation Partnership Project; Technical Specification Group Services and System Aspects; Telecommunication management; Subscriber and equipment trace; Trace control and configuration management (Release 15), Jun. 2018, pp. 1-189.

"3GPP TS 33.501 V15.4.0", 3rd Generation Partnership Project; Technical Specification Group Services and System Aspects; Security architecture and procedures for 5G system (Release 15), Mar. 2019, pp. 1-187.

"3GPP TS 23.003 V15.6.0", 3rd Generation Partnership Project; Technical Specification Group Core Network and Terminals; Numbering, addressing and identification (Release 15), Dec. 2018, pp. 1-130.

"AUSF Tracing Targeting a PEI" 3GPP TSG-CT WG4 Meeting #91, C4-192205, Reno, US, May 13-17, 2019, pp. 1-6.

"Supporting early trace in AUSF", SA WG2 Meeting #130, S2-1901143, Kochi, India (revision of S2-1900255), Jan. 21-25, 2019, pp. 1-2.

* cited by examiner

METHODS AND NETWORK NODES FOR TRACING USER EQUIPMENT

TECHNICAL FIELD

The present disclosure relates to communication technology, and more particularly, to methods and network nodes for tracing a User Equipment (UE).

BACKGROUND

The $5^{th}$ Generation System (5GS) supports subscriber tracing (targeting a Subscriber Permanent Identifier (SUPI)) and equipment tracing (targeting a Permanent Equipment Identifier (PEI)), as described in the $3^{rd}$ Generation Partnership Project (3GPP) Technical Specification (TS) 32.421 V15.0.0, which is incorporated herein by reference in its entirety.

3GPP TS 23.501, V16.0.2, TS 23.502, V16.0.2 and TS 23.503 V16.0.0, each of which is incorporated herein by reference in its entirety, define how the 5GS signaling supports delivery of trace requirement data (or referred to as trace data) for a UE. The delivery of trace requirement data can also be supported by an Operation, Administration and Maintenance (OAM) system. The trace requirement data contains e.g., a trace reference, a trace depth, a list of network entity types, a list of triggering events, an address of a trace collection entity and a list of interfaces (for details of the trace requirement data, reference can be made to TS 32.421). The trace requirement data may be configured in subscription data of the UE and delivered together with other subscription data from a Unified Data Management (UDM) node towards an Access and Mobility Management Function (AMF) node.

The AMF node can forward the trace requirement data received from the UDM node to network entities which do not retrieve the subscription data from the UDM node, e.g., to an access network node, an authentication node (e.g., Authentication Server Function (AUSF) node) and a Policy Control Function (PCF).

The AUSF node provides a UE authentication service (Nausf_UEAuthentication service, as defined in 3GPP TS 29.509, V15.3.0, which is incorporated herein by reference in its entirety) that allows the AMF node to authenticate a UE. The AMF node can initiate authentication of a UE by providing the AUSF node with the following information: a UE identifier (i.e., SUPI) and a serving network name. Depending on the information provided by the AMF node, the AUSF node enters one of the following authentication procedures: 5G-Authentication and Key Agreement (AKA) or Extensible Authentication Protocol (EAP)-based authentication. For further details of 5G-AKA, reference can be made to 3GPP TS 33.501 V15.4.0 and for details of EAP-based authentication, reference can be made to 3GPP TS 33.501 V15.4.0. In either authentication procedure, the AMF node can send a UE Authentication Request to the AUSF node. The UE Authentication Request contains AuthenticationInfo defined in Table 1 below:

TABLE 1

| Definition of type AuthenticationInfo | | | | |
|---|---|---|---|---|
| Attribute name | Data type | P | Cardinality | Description |
| supiOrSuci | SupiOrSuci | M | 1 | Contains the SUPI or SUCI of the UE. |
| servingNetworkName | ServingNetworkName | M | 1 | Contains the Serving Network Name. |
| resynchronizationInfo | ResynchronizationInfo | O | 0 . . . 1 | Contains RAND and AUTS; see 3GPP TS 33.501 subclause 9.4. |
| traceData | TraceData | O | 0 . . . 1 | Contains TraceData provided by the UDM to the AMF |

As shown in Table 1 above, a UE Authentication Request contains a SUPI or Subscriber Concealed Identifier (SUCI), a serving network name, resynchronization information and trace data (i.e., trace requirement data). For further details of Table 1, reference can be made to Table 6.1.6.2.2-1 in 3GPP TS 29.509.

SUMMARY

It is an object of the present disclosure to provide methods and network nodes for tracing a UE.

According to a first aspect of the present disclosure, a method in an Authentication Server Function (AUSF) node for tracing a UE is provided. The method includes: receiving a tracing activation instruction to activate tracing of the UE based on a permanent equipment identifier of the UE; obtaining trace requirement data associated with the UE; receiving from an Access and Mobility Management Function, AMF, node a first signaling message containing the permanent equipment identifier of the UE; and generating a trace record related to the UE based on the trace requirement data in response to receiving the first signaling message.

In an embodiment, the trace requirement data may be obtained from the tracing activation instruction.

In an embodiment, the trace requirement data may be obtained from the first signaling message.

In an embodiment, the first signaling message may be a UE Authentication Request.

In an embodiment, the trace requirement data may indicate: one or more triggering events, and/or one or more interfaces associated with the AUSF node.

In an embodiment, the operation of generating may include: generating a trace record related to one or more signaling messages associated with one of the one or more triggering events and transmitted or received over one of the one or more interfaces.

In an embodiment, the first signaling message may further contain a subscriber identifier, and the method may further include: storing the permanent equipment identifier in association with the subscriber identifier. The operation of generating may include: generating a trace record related to a signaling message associated with one of the one or more triggering events and transmitted or received over one of the one or more interfaces, in response to determining that the signaling message contains a subscriber identifier that is same as the subscriber identifier associated with the permanent equipment identifier.

In an embodiment, the subscriber identifier may include a SUPI or SUCI.

In an embodiment, the one or more triggering events may include a triggering event associated with UE authentication, a triggering event associated with Steering of Roaming (SoR) Protection, and/or a triggering event associated with UE Parameter Update (UPU) Protection, and/or the one or more interfaces may include an interface between the AUSF node and the AMF node, and/or an interface between the AUSF node and a UDM node.

In an embodiment, the tracing activation instruction may further contain an indication of a report period, and the method may further include: reporting the trace record to a trace collection entity indicated in the trace requirement data at the report period.

In an embodiment, the method may further include: receiving a tracing deactivation instruction to deactivate the tracing of the UE; and reporting the trace record to a trace collection entity indicated in the trace requirement data in response to receiving the tracing deactivation instruction.

According to a second aspect of the present disclosure, an AUSF node is provided. The AUSF node includes a communication interface, a processor and a memory. The memory contains instructions executable by the processor whereby the AUSF node is operative to perform the method according to the above first aspect.

According to a third aspect of the present disclosure, a computer readable storage medium is provided. The computer readable storage medium has computer program instructions stored thereon. The computer program instructions, when executed by a processor in an AUSF node, cause the AUSF node to perform the method according to the above first aspect.

According to a fourth aspect of the present disclosure, a method in an AMF node for facilitating tracing of a UE at an AUSF node is provided. The method includes: transmitting to the AUSF node a UE Authentication Request containing a permanent equipment identifier of the UE.

In an embodiment, the UE Authentication Request may further include trace requirement data.

According to a fifth aspect of the present disclosure, an AMF node is provided. The AMF node includes a communication interface, a processor and a memory. The memory contains instructions executable by the processor whereby the AMF node is operative to perform the method according to the above fourth aspect.

According to a sixth aspect of the present disclosure, a computer readable storage medium is provided. The computer readable storage medium has computer program instructions stored thereon. The computer program instructions, when executed by a processor in an AMF node, cause the AMF node to perform the method according to the above fourth aspect.

With the embodiments of the present disclosure, after receiving a tracing activation instruction to activate tracing of a UE based on a permanent equipment identifier of the UE and obtaining trace requirement data associated with the UE, an AUSF node receives a signaling message containing the permanent equipment identifier of the UE and responsively generates a trace record related to the UE based on the trace requirement data. In this way, the AUSF node can be provided with the permanent equipment identifier of the UE and thus be enabled to trace the UE based on its permanent equipment identifier.

BRIEF DESCRIPTION OF THE DRAWINGS

The above and other objects, features and advantages will be more apparent from the following description of embodiments with reference to the figures, in which.

DETAILED DESCRIPTION

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As discussed above, an AMF node can forward trace requirement data for a UE as received from a UDM node to an AUSF node, e.g., in a UE Authentication Request. As shown in Table 1 above, the UE Authentication Request also includes a subscriber identifier, e.g., SUPI or SUCI. However, the AUSF would not be able to trace an equipment identifier of the UE if it is not aware of the equipment identifier of the UE.

Figure 1:
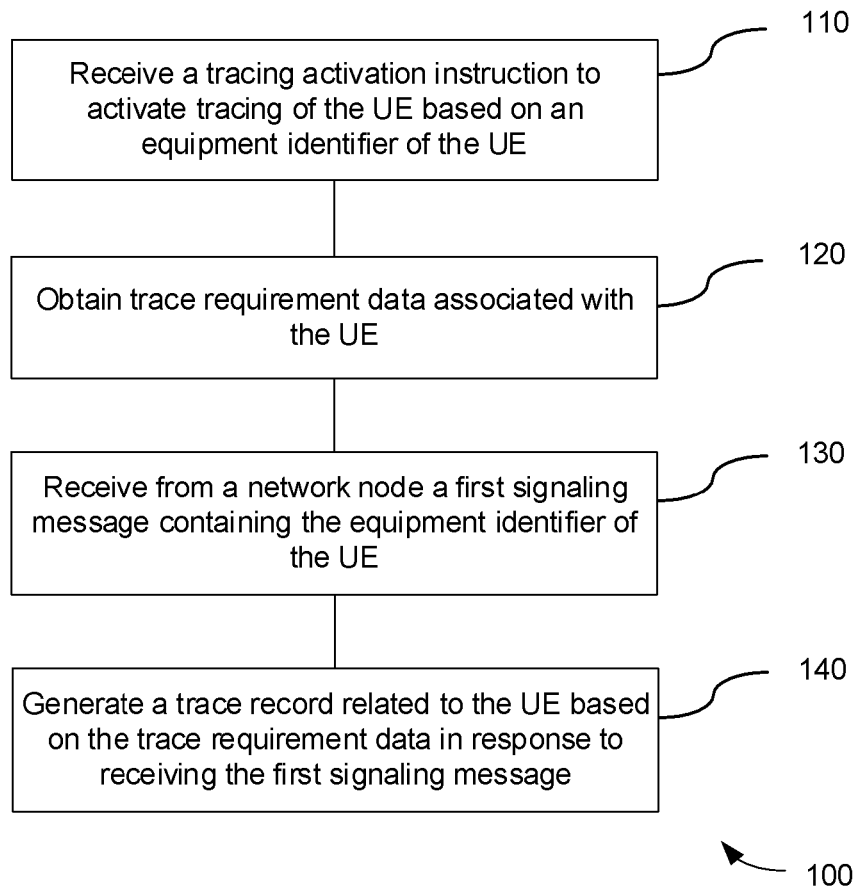
FIG. 1 is a flowchart illustrating a method in an authentication node for tracing a UE according to an embodiment of the present disclosure.

FIG. 1 is a flowchart illustrating a method 100 for tracing a UE according to an embodiment of the present disclosure. The method 100 can be performed at in an authentication node, e.g., an AUSF node.

At block 110, a tracing activation instruction to activate tracing the UE based on an equipment identifier of the UE is received. The tracing activation instruction can be received from a management system of an operator, e.g., an Operation, Administration and Maintenance (OAM) system. The equipment identifier can be a PEI of the UE.

At block 120, trace requirement data associated with the UE is obtained.

At block 130, a first signaling message containing the equipment identifier (e.g., PEI) of the UE is received from a network node. In an example, the network node can be an AMF node and the first signaling message can be a UE Authentication Request. In particular, the UE Authentication Request can be transmitted from a SEcurity Anchor Function (SEAF) in the AMF node. For example, AuthenticationInfo defined in Table 1 can be extended to include a PEI, as shown in Table 2 below:

TABLE 2

Definition of type AuthenticationInfo

| Attribute name | Data type | P | Cardinality | Description |
| --- | --- | --- | --- | --- |
| supiOrSuci | SupiOrSuci | M | 1 | Contains the SUPI or SUCI of the UE. |
| servingNetworkName | ServingNetworkName | M | 1 | Contains the Serving Network Name. |
| resynchronizationInfo | ResynchronizationInfo | O | 0 . . . 1 | Contains RAND and AUTS; see 3GPP TS 33.501 subclause 9.4. |
| Pei | Pei | O | 0 . . . 1 | Permanent Equipment Identifier |
| traceData | TraceData | O | 0 . . . 1 | Contains TraceData provided by the UDM to the AMF |

It can be appreciated that the authentication node may obtain the equipment identifier (e.g., PEI) of the UE from any other appropriate network node in any other appropriate signaling message, such that it can trace the equipment identifier of the UE accordingly.

For example, in the block 120, the trace requirement data may be obtained from the tracing activation instruction received in the block 110. Alternatively or additionally, the trace requirement data may be obtained from the first signaling message received in the block 130. As discussed above, the UE Authentication Request transmitted from the AMF node to the AUSF node may carry the trace requirement data (i.e., "traceData" as shown in Table 1), which can be retrieved by the AMF node from subscription data for the UE from a UDM node. The data structure of "traceData" as shown in Table 1 can also be used when the trace requirement data is carried in the tracing activation instruction. For example, the trace requirement data may have a data structure defined in Table 3 below:

TABLE 3

Definition of traceData

| Attribute name | Data type | P | Cardinality | Description |
| --- | --- | --- | --- | --- |
| traceRef | string | M | 1 | Trace Reference (see 3GPP TS 32.422 [19]). It shall be encoded as the concatenation of MCC, MNC and Trace ID as follows: <MCC><MNC>-<Trace ID> The Trace ID shall be encoded as a 3 octet string in hexadecimal representation. Each character in the Trace ID string shall take a value of "0" to "9" or "A" to "F" and shall represent 4 bits. The most significant character representing the 4 most significant bits of the Trace ID shall appear first in the string, and the character representing the 4 least significant bit of the Trace ID shall appear last in the string. Pattern: '^[0-9]{3}[0-9]{2,3}-[A-Fa-f0-9]{6}$' |

TABLE 3-continued

Definition of traceData

| Attribute name | Data type | P | Cardinality | Description |
|---|---|---|---|---|
| traceDepth | TraceDepth | M | 1 | Trace Depth (see 3GPP TS 32.422 [19]). |
| neTypeList | string | M | 1 | List of NE Types (see 3GPP TS 32.422 [19]). It shall be encoded as an octet string in hexadecimal representation. Each character in the string shall take a value of "0" to "9" or "A" to "F" and shall represent 4 bits. The most significant character representing the 4 most significant bits shall appear first in the string, and the character representing the 4 least significant bit shall appear last in the string. Octets shall be coded according to 3GPP TS 32.422 [19]. Pattern: '^[A-Fa-f0-9]+$' |
| eventList | string | M | 1 | Triggering events (see 3GPP TS 32.422 [19]). It shall be encoded as an octet string in hexadecimal representation. Each character in the string shall take a value of "0" to "9" or "A" to "F" and shall represent 4 bits. The most significant character representing the 4 most significant bits shall appear first in the string, and the character representing the 4 least significant bit shall appear last in the string. Octets shall be coded according to 3GPP TS 32.422 [19]. Pattern: '^[A-Fa-f0-9]+$' |
| collectionEntityIpv4Addr | Ipv4Addr | C | 0 ... 1 | IPv4 Address of the Trace Collection Entity (see 3GPP TS 32.422 [x]). At least one of the collectionEntityIpv4Addr or collectionEntityIpv6Addr attributes shall be present. |
| collectionEntityIpv6Addr | Ipv6Addr | C | 0 ... 1 | IPv6 Address of the Trace Collection Entity (see 3GPP TS 32.422 [x]). At least one of the collectionEntityIpv4Addr or collectionEntityIpv6Addr attributes shall be present. |
| interfaceList | string | O | 0 ... 1 | List of Interfaces (see 3GPP TS 32.422 [19]). It shall be encoded as an octet string in hexadecimal representation. Each character in the string shall take a value of "0" to "9" or "A" to "F" and shall represent 4 bits. The most significant character representing the 4 most significant bits shall appear first in the string, and the character representing the 4 least significant bit shall appear last in the string. Octets shall be coded according to 3GPP TS 32.422 [19]. If this attribute is not present, all the interfaces applicable to the list of NE types indicated in the neTypeList attribute should be traced. Pattern: '^[A-Fa-f0-9+]$' |

For further details of Table 3, reference can be made to Table 5.6.4.1-1 in 3GPP TS 29.571 V15.3.0, which is incorporated herein by reference in its entirety.

At block 140, a trace record related to the UE is generated based on the trace requirement data in response to receiving the first signaling message, or in other words, in response to determining that the equipment identifier contained in the first signaling message is same as the equipment identifier contained in the tracing activation instruction.

In an example, the trace requirement data may indicate, among others, one or more triggering events, and/or one or more interfaces associated with the authentication node. That is, the trace requirement data may indicate that the authentication node is to record information related to one or more signaling messages associated with each triggering event over each interface required by the trace requirement data. For example, the one or more triggering events may include a triggering event associated with UE authentication (for Nausf_UEAuthentication service), a triggering event associated with SoR Protection (for Nausf_SoRProtection service), and/or a triggering event associated with UPU Protection (for Nausf_UPUProtection service). The one or more interfaces may include an interface between the authentication node and the AMF node (the interface between the AUSF node and the AMF node is known as N12), and/or an interface between the authentication node and a UDM node (the interface between the AUSF node and the UDM node is known as N13).

In the block 140, a trace record related to one or more signaling messages associated with one of the one or more triggering events and transmitted or received over one of the one or more interfaces can be generated. For example, when the trace requirement data indicates the triggering event associated with UE authentication and the interface N12, the authentication node can generate a trace record containing information related to the UE Authentication Request and subsequent signaling messages for UE Authentication over N12. For instance, when the trace requirement data further indicates a trace depth of "maximum", the trace record may include the raw messages of the UE Authentication Request and the subsequent signaling messages. As another example, when the trace requirement data indicates the triggering event associated with UE authentication and the interfaces N12 and N13, the authentication node can generate a trace record containing information related to each signaling message for UE Authentication over N12 and N13.

In an example, the first signaling message (e.g., UE Authentication Request) may further contain a subscriber identifier, e.g., a SUPI or SUCI. The authentication node may store the equipment identifier in association with the subscriber identifier. Then, when receiving a signaling message that is associated with one of the one or more triggering events indicated in the trace requirement data and is transmitted or received over one of the one or more interfaces indicated in the trace requirement data, and determining that the signaling message contains a subscriber identifier that is same as the subscriber identifier associated with the equipment identifier, the authentication node can generate a trace record related to the signaling message. That is, even if the signaling message does not contain any equipment identifier, information related to the signaling message can be recorded for the purpose of equipment tracing as long as it contains the subscriber identifier that has been associated with the equipment identifier to be traced, e.g., in the UE authentication process, at the authentication node.

In an example, when the tracing activation instruction further contains an indication of a report period, the authentication node can report the trace record to a trace collection entity indicated in the trace requirement data at the report period. Alternatively, the authentication node can report the trace record to a trace collection entity indicated in the trace requirement data in response to receiving, e.g., from an OAM system, a tracing deactivation instruction to deactivate the tracing of the UE.

Figure 2:
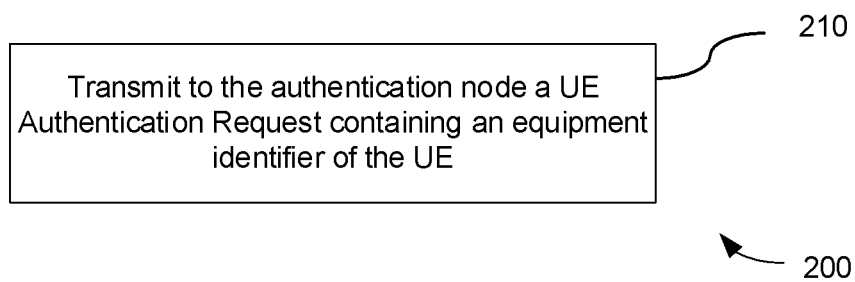
FIG. 2 is a flowchart illustrating a method in a network node for facilitating tracing of a UE at an authentication node according to an embodiment of the present disclosure.

FIG. 2 is a flowchart illustrating a method 200 for facilitating tracing of a UE at an authentication node according to an embodiment of the present disclosure. The method 200 can be performed at a network node, e.g., an AMF node, or particularly SEAF in the AMF node, and the authentication node can be an AUSF node.

At block 210, a UE Authentication Request containing an equipment identifier of the UE is transmit to the authentication node. For example, the equipment identifier can be a PEI. The UE Authentication Request may correspond to the first signaling message received by the authentication node in the block 130 of FIG. 1. As a result, the authentication node is provided with the equipment identifier of the UE and thus enabled to trace the UE based on its equipment identifier.

As described above in connection with FIG. 1, the UE Authentication Request may further include trace requirement data for tracing of the UE. The trace requirement data can be retrieved from subscription data for the UE from a UDM node.

Figure 3:
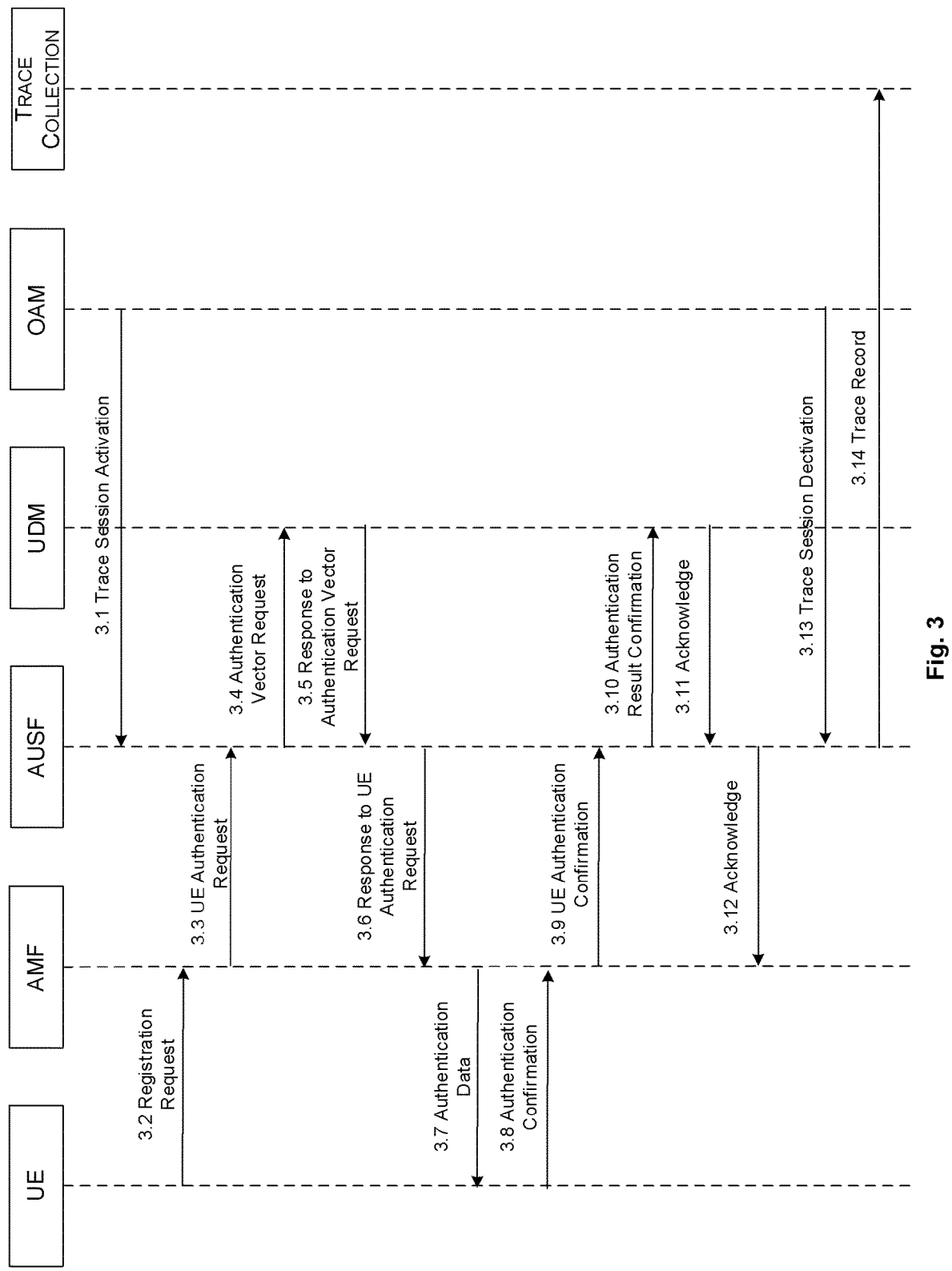
FIG. 3 is a schematic diagram showing a UE tracing procedure according to an embodiment of the present disclosure.

In the following, the above methods 100 and 200 will be further explained with reference to a sequence diagram of FIG. 3, which shows a UE tracing procedure according to an embodiment of the present disclosure As shown in FIG. 3, at 3.1, an AUSF node receives from an OAM system a Trace Session Activation containing a PEI of a UE, for activating tracing of the UE based on the PEI at the AUSF node. The Trace Session Activation may include trace requirement data and optionally a report period. Next, a UE authentication process will be performed. While in this example the UE authentication process is based on 5G-AKA, an EAP-based authentication process can be used as an alternative. At 3.2, an AMF node receives a registration request from a UE. At 3.3, the AMF node (or particularly SEAF in the AMF node) sends a UE Authentication Request to the AUSF node. The UE Authentication Request contains a PEI of the UE, a SUPI or SUCI, and optionally trace requirement data. In this example, it is assumed that the trace requirement data received by the AUSF node at 3.1 or 3.3 may indicate:
traceRef: 123-456-ID1,
traceDepth: Maximum,
neTypeList: AUSF,
eventList: UE Authentication,
collectionEntityIpv4Addr: 192.168.1.1,
interfaceList: N12, N13.

When the PEI in the UE Authentication Request received at 3.3 is same as the PEI in the Trace Session Activation, the AUSF node determines that the UE Authentication Request is for the UE to be traced. Moreover, as the UE Authentication Request is associated with the triggering event of UE Authentication and is received over N12, the AUSF node generates a trace record to record information related to the UE Authentication Request. Here, as the trace depth is set to "Maximum", the raw message of the UE Authentication Request is recorded. At 3.4, the AUSF node sends an Authentication Vector Request to a UDM node. As the Authentication Vector Request is also associated with the triggering event of UE Authentication and is transmitted over N13, the AUSF node records information related to the Authentication Vector Request in the trace record. Then, the UE authentication process continues as the UDM node sends a Response to Authentication Vector Request to the AUSF node over N13 at 3.5; the AUSF node sends a Response to UE Authentication Request over N12 at 3.6; the AMF node sends authentication data to the UE at 3.7 and receives an Authentication Confirmation at 3.8; the AMF node sends a UE Authentication Confirmation to the AUSF over N12 at 3.9; the AUSF node sends an Authentication Result Confirmation to the UDM node over N13 at 3.10; the AUSF node receives from the UDM node an acknowledgement over N13 at 3.11 and sends an acknowledgement to the AMF node over N12 at 3.12. During this process, the AUSF node records information related to each signaling message transmitted or received over N12 or N13, including the signaling messages transmitted or received at 3.5, 3.6, 3.9, 3.10, 3.11 and 3.12, in the trace record. At 3.13, the AUSF node receives from the OAM system a Trace Session Deactivation to deactivate the tracing of the UE. At 3.14, the AUSF node reports the trace record to a trace collection entity indicated in the trace requirement data. Instead of reporting the trace record in response to the Trace Session Deactivation, the AUSF node may report the trace record periodically in accordance with the period indicated in the Trace Session Activation received at 3.1.

Figure 4:
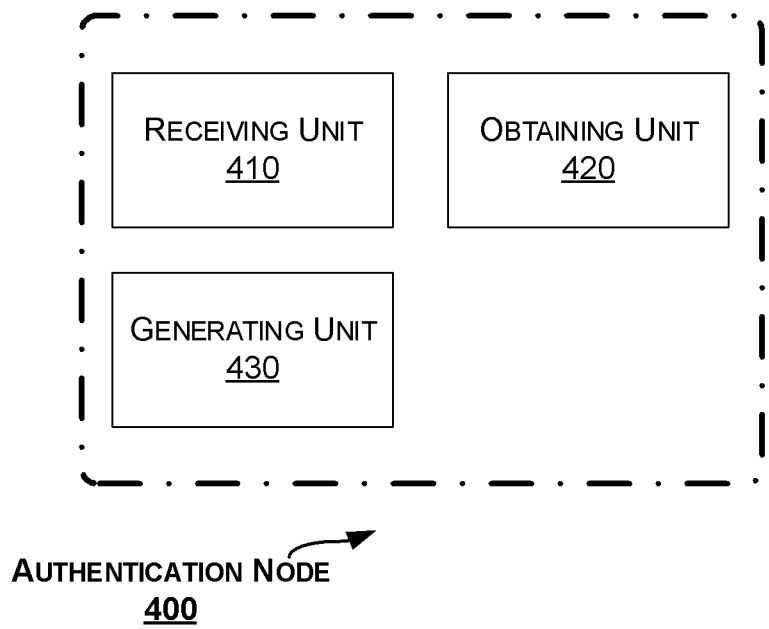
FIG. 4 is a block diagram of an authentication node according to an embodiment of the present disclosure.

Correspondingly to the method 100 as described above, an authentication node is provided. FIG. 4 is a block diagram of an authentication node 400 according to an embodiment of the present disclosure.

As shown in FIG. 4, the authentication node 400 includes a receiving unit 410 configured to receive a tracing activation instruction to activate tracing of the UE based on an equipment identifier of the UE. The authentication node 400 further includes an obtaining unit 420 configured to obtain trace requirement data associated with the UE. The receiving unit 410 is further configured to receive from a network node a first signaling message containing the equipment identifier of the UE. The authentication node 400 further includes a generating unit 430 configured to generate a trace record related to the UE based on the trace requirement data in response to receiving the first signaling message.

In an embodiment, the trace requirement data may be obtained from the tracing activation instruction.

In an embodiment, the trace requirement data may be obtained from the first signaling message.

In an embodiment, the network node may be an AMF node and the first signaling message may be a UE Authentication Request.

In an embodiment, the trace requirement data may indicate: one or more triggering events, and/or one or more interfaces associated with the authentication node.

In an embodiment, the generating unit 430 can be configured to generate a trace record related to one or more signaling messages associated with one of the one or more triggering events and transmitted or received over one of the one or more interfaces.

In an embodiment, the first signaling message may further contain a subscriber identifier. The authentication node 400 may further include a storage unit configured to store the equipment identifier in association with the subscriber identifier. The generating unit 430 can be configured to generate a trace record related to a signaling message associated with one of the one or more triggering events and transmitted or received over one of the one or more interfaces, in response to determining that the signaling message contains a subscriber identifier that is same as the subscriber identifier associated with the equipment identifier.

In an embodiment, the subscriber identifier may include a SUPI or SUCI.

In an embodiment, the one or more triggering events may include a triggering event associated with UE authentication, a triggering event associated with Steering of Roaming (SoR) Protection, and/or a triggering event associated with UE Parameter Update (UPU) Protection, and/or the one or more interfaces may include an interface between the authentication node and the AMF node, and/or an interface between the authentication node and a UDM node.

In an embodiment, the tracing activation instruction may further contain an indication of a report period. The authentication node 400 may further include a reporting unit configured to report the trace record to a trace collection entity indicated in the trace requirement data at the report period.

In an embodiment, the receiving unit 410 may further be configured to receive a tracing deactivation instruction to deactivate the tracing of the UE. The authentication node 400 may further include a reporting unit configured to report the trace record to a trace collection entity indicated in the trace requirement data in response to receiving the tracing deactivation instruction.

In an embodiment, the equipment identifier may be a PEI.

In an embodiment, the authentication node may be an AUSF node.

The receiving unit 410, the obtaining unit 420 and the generating unit 430 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 5:
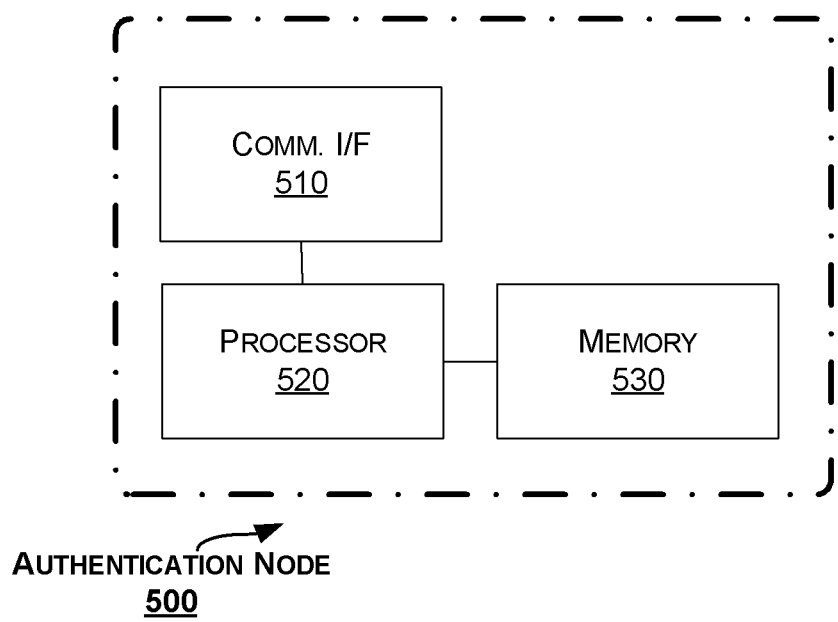
FIG. 5 is a block diagram of an authentication node according to another embodiment of the present disclosure.

FIG. 5 is a block diagram of an authentication node 500 according to another embodiment of the present disclosure.

The authentication node 500 includes a communication interface 510, a processor 520 and a memory 530. The memory 530 contains instructions executable by the processor 520 whereby the authentication node 500 is operative to perform the actions, e.g., of the procedure described earlier in conjunction with FIG. 1. Particularly, the memory 530 contains instructions executable by the processor 520 whereby the authentication node 500 is operative to: receive a tracing activation instruction to activate tracing of the UE based on an equipment identifier of the UE; obtain trace requirement data associated with the UE; receive from a network node a first signaling message containing the equipment identifier of the UE; and generate a trace record related to the UE based on the trace requirement data in response to receiving the first signaling message.

In an embodiment, the trace requirement data may be obtained from the tracing activation instruction.

In an embodiment, the trace requirement data may be obtained from the first signaling message.

In an embodiment, the network node may be an AMF node and the first signaling message may be a UE Authentication Request.

In an embodiment, the trace requirement data may indicate: one or more triggering events, and/or one or more interfaces associated with the authentication node.

In an embodiment, the operation of generating may include: generating a trace record related to one or more signaling messages associated with one of the one or more triggering events and transmitted or received over one of the one or more interfaces.

In an embodiment, the first signaling message may further contain a subscriber identifier. The memory 530 may further contain instructions executable by the processor 520 whereby the authentication node 500 is operative to: store the equipment identifier in association with the subscriber identifier. The operation of generating may include: generating a trace record related to a signaling message associated with one of the one or more triggering events and transmitted or received over one of the one or more interfaces, in response to determining that the signaling message contains a subscriber identifier that is same as the subscriber identifier associated with the equipment identifier.

In an embodiment, the subscriber identifier may include a SUPI or SUCI.

In an embodiment, the one or more triggering events may include a triggering event associated with UE authentication, a triggering event associated with Steering of Roaming (SoR) Protection, and/or a triggering event associated with UE Parameter Update (UPU) Protection, and/or the one or more interfaces may include an interface between the authentication node and the AMF node, and/or an interface between the authentication node and a UDM node.

In an embodiment, the tracing activation instruction may further contain an indication of a report period. The memory 530 may further contain instructions executable by the processor 520 whereby the authentication node 500 is operative to: report the trace record to a trace collection entity indicated in the trace requirement data at the report period.

In an embodiment, the memory 530 may further contain instructions executable by the processor 520 whereby the authentication node 500 is operative to: receive a tracing deactivation instruction to deactivate the tracing of the UE; and report the trace record to a trace collection entity indicated in the trace requirement data in response to receiving the tracing deactivation instruction.

In an embodiment, the equipment identifier may be a PEI.

In an embodiment, the authentication node may be an AUSF node.

Figure 6:
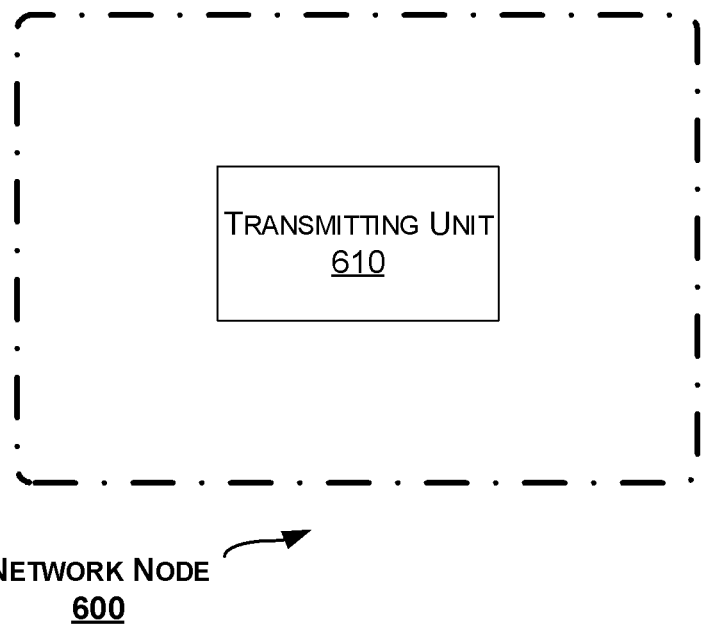
FIG. 6 is a block diagram of a network node according to an embodiment of the present disclosure.

Correspondingly to the method 200 as described above, a network node is provided. FIG. 6 is a block diagram of a network node 600 according to an embodiment of the present disclosure.

As shown in FIG. 6, the network node 600 includes a transmitting unit 610 configured to transmit to the authentication node a UE Authentication Request containing an equipment identifier of the UE.

In an embodiment, the UE Authentication Request may further include trace requirement data.

In an embodiment, the network node may be an AMF node, the authentication node may be an AUSF node, and the equipment identifier may be a PEI.

The transmitting unit 610 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 7:
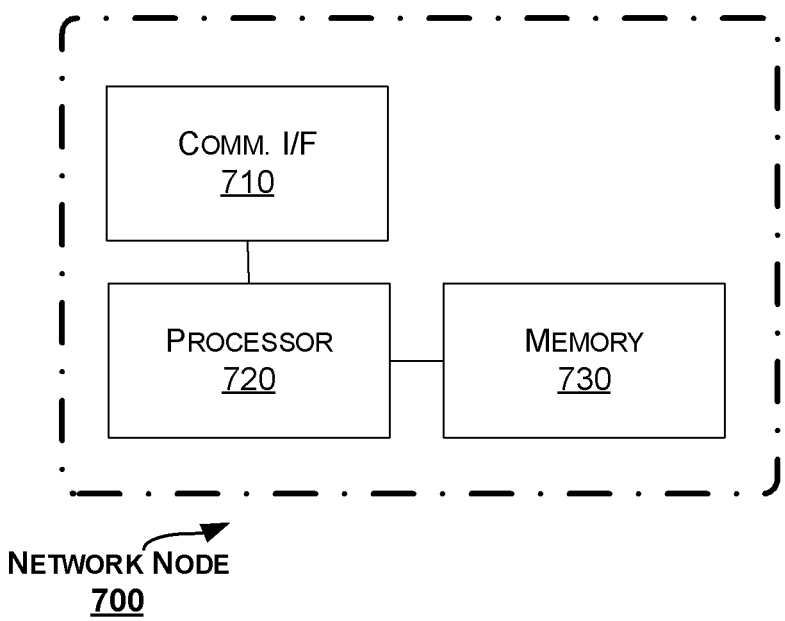
FIG. 7 is a block diagram of a network node according to another embodiment of the present disclosure.

FIG. 7 is a block diagram of a network node 700 according to another embodiment of the present disclosure.

The network node 700 includes a communication interface 710, a processor 720 and a memory 730. The memory 730 contains instructions executable by the processor 720 whereby the network node 700 is operative to perform the actions, e.g., of the procedure described earlier in conjunction with FIG. 2. Particularly, the memory 730 contains instructions executable by the processor 720 whereby the network node 700 is operative to: transmit to the authentication node a UE Authentication Request containing an equipment identifier of the UE.

In an embodiment, the UE Authentication Request may further include trace requirement data.

In an embodiment, the network node may be an AMF node, the authentication node may be an AUSF node, and the equipment identifier may be a PEI.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 520 causes the authentication node 500 to perform the actions, e.g., of the procedure described earlier in conjunction with FIG. 1; or code/computer readable instructions, which when executed by the processor 720 causes the network node 700 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method performed by an Authentication Server Function, (AUSF) node for tracing a User Equipment (UE) comprising:
   receiving a tracing activation instruction to activate tracing of the UE based on a permanent equipment identifier of the UE;
   obtaining trace requirement data associated with the UE;
   receiving from an Access and Mobility Management Function (AMF) node a first signaling message containing the permanent equipment identifier of the UE; and
   generating a trace record related to the UE based on the trace requirement data in response to receiving the first signaling message.

2. The method of claim 1, wherein the trace requirement data is obtained from the tracing activation instruction.

3. The method of claim 1, wherein the trace requirement data is obtained from the first signaling message.

4. The method of claim 1, wherein the first signaling message is a UE Authentication Request.

5. The method of claim 1, wherein the trace requirement data indicates at least one of the following:
   one or more triggering events, and
   one or more interfaces associated with the AUSF node.

6. The method of claim 5, wherein said generating comprises:
   generating a trace record related to one or more signaling messages associated with one of the one or more triggering events, the one or more signaling messages transmitted or received over one of the one or more interfaces.

7. The method of claim 6, wherein:
   the first signaling message further contains a subscriber identifier;
   the method further comprises storing the permanent equipment identifier in association with the subscriber identifier; and
   said generating comprises generating a trace record related to a signaling message associated with one of the one or more triggering events and transmitted or received over one of the one or more interfaces, in response to determining that the signaling message contains a subscriber identifier that is same as the subscriber identifier associated with the permanent equipment identifier.

8. The method of claim 7, wherein the subscriber identifier comprises a Subscriber Permanent Identifier (SUPI) or a Subscriber Concealed Identifier (SUCI).

9. The method of claim 5, wherein at least one of the following applies:
   the one or more triggering events comprises at least one of a triggering event associated with UE authentication, a triggering event associated with Steering of Roaming (SoR) Protection, and a triggering event associated with UE Parameter Update (UPU) Protection; and
   the one or more interfaces comprises at least one of an interface between the AUSF node and the AMF node, and an interface between the AUSF node and a Unified Data Management (UDM) node.

10. The method of claim 1, wherein the tracing activation instruction further contains an indication of a report period, and the method further comprises:
reporting the trace record to a trace collection entity indicated in the trace requirement data at the report period.

11. The method of claim 1, further comprising:
receiving a tracing deactivation instruction to deactivate the tracing of the UE; and
reporting the trace record to a trace collection entity indicated in the trace requirement data in response to receiving the tracing deactivation instruction.

12. An Authentication Server Function (AUSF) node, comprising:
a communication interface;
a processor operably coupled to the communication interface; and
a memory storing instructions, which when executed by the processor, cause the AUSF node to perform operations corresponding to the method according to claim 1.

13. A non-transitory, computer-readable storage medium having computer program instructions stored thereon, wherein the computer program instructions, when executed by a processor in an Authentication Server Function (AUSF) node, cause the AUSF node to perform operations corresponding to the method according to claim 1.

14. A method performed by an Access and Mobility Management Function (AMF) node for facilitating tracing of a User Equipment (UE) at an Authentication Server Function (AUSF) node, the method comprising:
transmitting to the AUSF node a UE Authentication Request containing a permanent equipment identifier of the UE, wherein the permanent equipment identifier of the UE facilitates generation by the AUSF node of a trace record related to the UE, based on a tracing activation instruction and trace requirement data.

15. The method of claim 14, wherein the UE Authentication Request further includes one or more of the following: the trace requirement data, and a subscriber identifier.

16. An Access and Mobility Management Function (AMF) node, comprising:
a communication interface;
a processor operably coupled to the communication interface; and
a memory storing instructions which when executed by the processor, cause the AMF node to perform operations corresponding to the method according to claim 14.

17. A non-transitory, computer-readable storage medium having computer program instructions stored thereon, wherein the computer program instructions, when executed by a processor in an Access and Mobility Management Function (AMF) node, cause the AMF node to perform operations corresponding to the method according to claim 14.

* * * * *